W. J. WATKINS.
APPARATUS FOR MANUFACTURING CARBURETED GAS.
APPLICATION FILED MAY 15, 1911.
1,116,653. Patented Nov. 10, 1914.
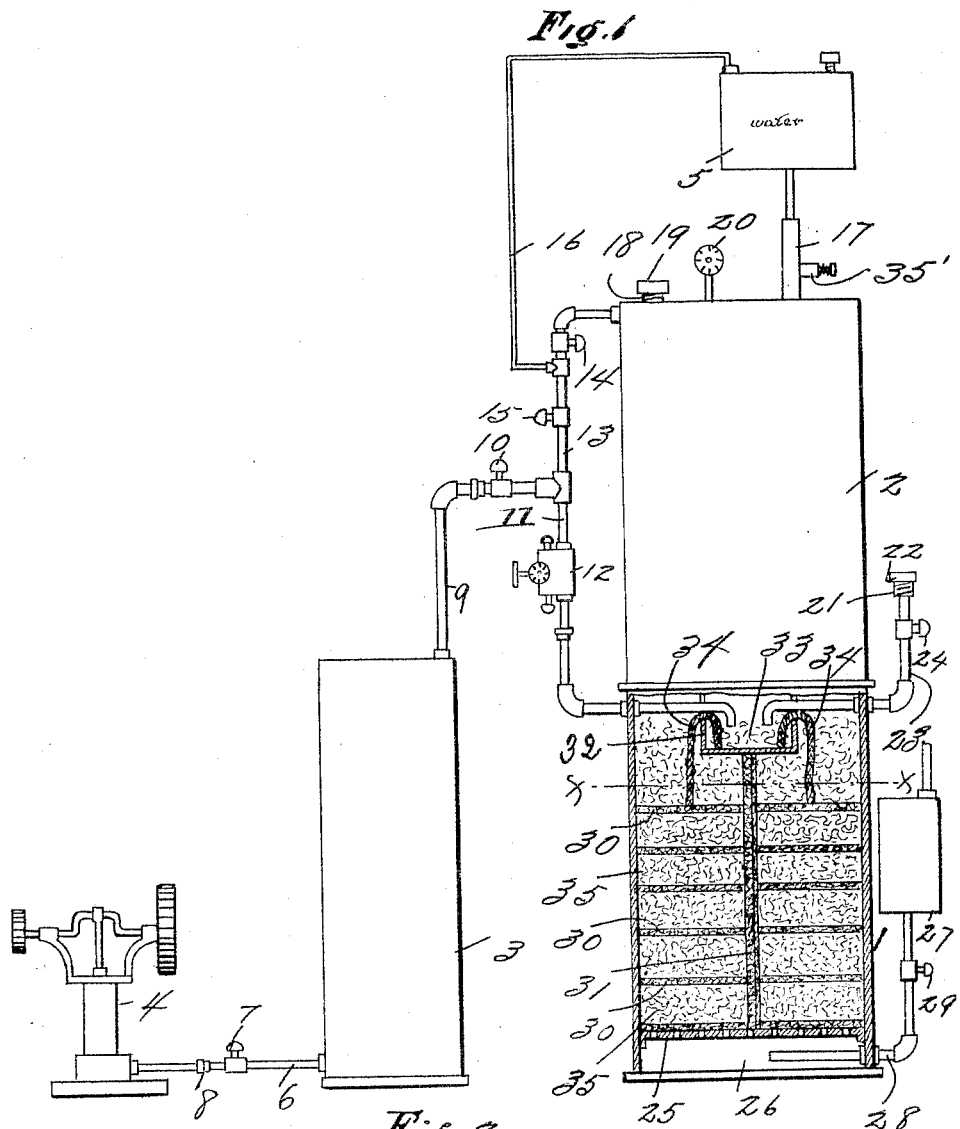
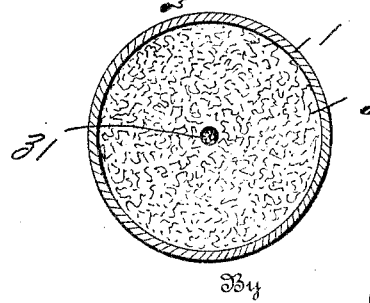

UNITED STATES PATENT OFFICE.

WILLIAM J. WATKINS, OF FORT WORTH, TEXAS, ASSIGNOR TO O. G. HURDLESTON, OF FORT WORTH, TEXAS.

APPARATUS FOR MANUFACTURING CARBURETED GAS.

1,116,653.  Specification of Letters Patent.  Patented Nov. 10, 1914.

Application filed May 15, 1911. Serial No. 627,261.

*To all whom it may concern:*

Be it known that I, WILLIAM J. WATKINS, a citizen of the United States, residing at Fort Worth, in the county of Tarrant and State of Texas, have invented certain new and useful Improvements in Apparatus for Manufacturing Carbureted Gas, of which the following is a specification.

My invention relates to apparatus for manufacturing gas and more particularly to means for generating gas, and the object is to provide gas generators for manufacturing gas at small cost for illuminating and general heating purposes and a further object is to provide apparatus by which gas may be produced in small or large quantities, that is, a small plant or a large plant may be installed as may be desired.

Another object is to provide inexpensive and simple apparatus which will be simple in operation.

Other objects and advantages will be fully explained in the following description and the invention will be more particularly pointed out in the claims.

Reference is had to the accompanying drawings which form a part of this application.

Figure 1 is a diagrammatic view of a gas manufacturing apparatus constructed in accordance with my invention, the gas generating tank being shown in section. Fig. 2 is a horizontal section taken on the line $x$—$x$ of Fig. 1.

Similar characters of reference are used to indicate the same parts throughout the several views.

The apparatus includes a generating tank 1, a pressure tank 2, a compressed air tank 3, and a water tank 5. The pump 4 is connected to the compressed air tank 3 by a pipe 6 with cock 7 and union 8. The compressed air-tank 3 is connected to the gas generating tank 1 by means of pipe 9 which is provided with a cock 10 and pipe 11 which is provided with a diaphragm valve 12 for regulating the air or gas pressure which is to be supplied to the tank 1. The tank 2 is also connected with the tank 1 by which an artificial pressure may be applied to materials in the tank 1. The tank 2 is connected to tank 1 by a pipe 13 which is provided with cocks 14 and 15 connecting the pipe 11. Either or both tanks 2 and 3 may be connected to the water tank 5 by a tube 16. A pipe 17 connects the water tank 5 with the tank 2 for the purpose of letting water into the tank 2. A filling tube 18 is provided for the tank 2 and the nozzle 18 is closed by a cap 19. The tank 2 is also provided with a pressure gage 20. The tank 1 is provided with a receiving tube 21 which is normally closed by a cap 22. A pipe 23 which connects the tube 21 with the tank 1 is provided with a cock 24. A partition 25 constitutes a false bottom for the tank 1 and forms a gas chamber in the bottom of the tank from which gas is taken for service. The partition 25 is perforated for the passage of gas down into the chamber 26. A purifier 27 is provided and connected to the chamber 26 by a pipe 28 which is provided with a cock 29. A series of partitions 30 composed of cotton or other fiber are mounted in the generator 1 and a central conductor 31 of cotton or other fiber is mounted in the tank and is engaged by all the partitions 30, so that the conductor 31 will lead liquid materials to all the partitions 30. A liquid containing vessel 32 is suspended in the tank 1. A layer 33 of cotton or other fiber is placed in the vessel 32 and arms 34 of the fiber lead out of the vessel 32 and communicate with the contents of the tank 1.

The partitions or disks 30 are not fixed, but may be moved upward or downward when being adjusted and will be in engagement with the central distributer 31. A main filler 35 is placed on each partition 30, except the top partition 30. This filler is composed of parts, equal in bulk, of pine shavings and iron borings or slugs, and each layer may be of such thickness as may be required by the quantity of gas to be manufactured. On the top partition 30 a different composition is placed. This composition consists of the above noted composition and also other ingredients, as follows: Black oxid of manganese ($MNO_2$), carbonate of ammonia, ($NH_4$)$_2CO_3$, and bicarbonate of soda ($HNaCO_3$). The formula is as follows: Approximately 200 lbs. of the pine shavings and the iron borings, and 4 lbs. each of the black oxid of manganese, carbonate of ammonia, and bicarbonate of soda. A sufficient quantity of nitric acid having the strength of $16\frac{2}{3}\%$ (sixteen and two-thirds per cent.), is placed in the receptacle 32 to saturate the entire mass of the material lying on all the partitions 30. The pine shavings will serve to retain nitric acid for a continual feed to the other material, the reaction will be as follows:

$$2Fe + 8HNO_3 = 2Fe(NO_3)_3 + 2NO + 4H_2O.$$

$$MnO_2 + 2HNO_3 = Mn(NO_3)_2 + H_2O + O.$$

$$(NH_4)_2CO_3 + 2HNO_3 = 2NH_4NO_3 + H_2O + CO_2.$$

$$HNaCO_3 + HNO_3 = NaNO_3 + H_2O + CO_2.$$

The gases thus generated are carbureted by kerosene, gasolene, or other hydrocarbon oil, which is introduced into vessel 32 through the filling tube 21 and pipe 23, the liquid hydrocarbon oil being converted into vapor by the heat generated in the tank. The functions of the gases generated in the tank will multiply the quantity of the gaseous fuel for heating and illuminating purposes, and for operating gas engines. The nitric acid and the hydrocarbon oil are distributed to the various parts of the tank by the fiber ropes or cords 34 and the fiber partitions 30. The air pressure from the compressed air tank 3 thoroughly commingles with the gases generated in tank 1 and with the vapors from the hydrocarbon oils. Compressed air is forced into the tank 3 by pump 4 and the air can be let into the tank 1 as desired. Air pressure is necessary for the operation of the generation of the gas. A gas pressure may be used instead of air pressure or in combination with the air pressure.

A tank 2 which may be an extension of the tank 1 is provided for generating gas (by chemicals) which can be let into tank 1 by the pipes 13 and 11. To secure a pressure of one hundred pounds, place five pounds of sodium carbonate and one quart of nitric acid and twelve ounces of water from tank 5 in the tank 2. The sodium carbonate and nitric acid will produce sodium nitrate, water and carbon dioxid. The amount of pressure let into the tank 1 can be regulated by the pressure regulator 12. If no pressure is needed from tank 2, the cock 15 can be closed (but not while gas is being generated in chamber 2). If no air pressure is needed the cock 10 can be closed. It has been demonstrated that one gallon of gasolene placed in the tank 1 will cause, together with the other material, a generation of approximately three thousand cubic feet of gas. The pine shavings and the iron borings will be consumed and the tank must be replenished from time to time. Pressure, either compressed air or gas pressure is necessary at all times for the generation of gas. If gas pressure is being used from the tank 2, a sight feed drip valve 35' is provided in the pipe 17 and may be set so that when the pressure goes below ten pounds, the valve will open and let in more water from tank 5. A tube 16 is provided to equalize the pressure in the tank 5 so that gas or air will press on the surface of water in the tank. Gas collects in the chamber 26 and is let out through a pipe 28 to pass to the purifier 27 to be cleansed. The gas can be used from the purifier.

Having fully described my invention, what I claim as new and desire to secure by Letters Patent, is,—

1. Apparatus for generating gas comprising a tank, a series of fiber partitions horizontally disposed in said tank, a central fiber stem engaging all of said partitions, iron borings and pine shavings placed on said partitions, a liquid container in said tank above said partitions, means for introducing liquids for making gas in said container, fiber cords for distributing said liquids from said container, and means for forcing air into said tank.

2. Apparatus for generating gas comprising a tank, a series of fiber partitions horizontally disposed and movable in said tank for distributing gas making liquids to all parts of said tank, a central fiber stem engaging all of said partitions, layers composed of a mixture of pine shavings and iron borings placed on each partition except the upper partition, a composition of gas-making material placed on the upper layer, means for distributing liquid gas making material on the last mentioned mixture, and means for applying air pressure to the contents of said tank.

3. Apparatus for generating gas comprising a tank, a series of fiber partitions horizontally disposed and movable in said tank, a central fiber stem in constant engagement with all of said partitions, gas making materials placed on said partitions, a liquid containing vessel in said tank above said partitions, means for distributing liquids from said vessel to the materials next to said vessel, a compressed air tank and pipes connecting said compressed air tank with said first named tank, and means for introducing gas making liquids into said liquid containing vessel.

4. Apparatus for generating gas comprising a tank, a series of fiber partitions horizontally disposed in said tank, gas making materials placed on said partitions, a liquid containing vessel in said tank above said partitions, means for distributing liquids from said vessel to the contents of said tank below the vessel, a compressed air tank, a pipe connecting said air tank with said gas generating tank, means intercepting said pipe for regulating the air-pressure going into said gas generating tank, means for introducing gas making liquids into said liquid containing vessel, a false bottom in said generating tank perforated and forming a gas chamber in the lower part of said tank, and a purifier connected with said gas chamber.

5. In an apparatus for generating gas, a tank, a series of fiber partitions horizontally disposed in said tank, a central fiber stem engaging all of said partitions, gas making material placed on said partitions, and a container in said tank for gas making liquids adapted to feed to the gas making material adjacent thereto.

6. In an apparatus for generating gas, a tank, a series of fiber partitions in said tank, a fiber stem engaging all of said partitions, gas making material intimately associated with said partitions, and a container for gas making liquids adapted to feed to the gas making material adjacent thereto.

7. In an apparatus for generating gas, a tank, a series of spaced fiber elements therein, fiber conducting means engaging all of said elements, gas making material in the spaces between said elements and intimately associated therewith, and a container for gas making liquids adapted to feed to the gas making material adjacent thereto.

8. In an apparatus for generating gas, a tank, a series of spaced fibrous elements therein, fibrous conducting means engaging all of said elements, gas making material in the spaces between said elements and intimately associated therewith, a container within the tank for the gas making liquids, and fiber conducting means leading from said container to feed to the gas making material adjacent to said container.

9. In an apparatus for generating gas, a tank, a series of spaced fibrous elements therein, fibrous conducting means engaging all of said elements, gas making material in the spaces between said elements and intimately associated therewith, a container within the tank for the gas making liquids, fiber conducting means leading from said container to feed to the gas making material adjacent to the container, and means for applying air pressure to the contents of the tank.

10. In an apparatus for generating gas, a tank, a series of fiber partitions horizontally disposed in said tank, a central fiber stem engaging all of said partitions, gas making material placed on said partitions, a container in said tank for gas making liquids and fiber conducting means leading from said container to feed to the gas making material adjacent to said container.

11. In an apparatus for generating gas, a tank, a series of fiber partitions horizontally disposed in said tank, a central fiber stem engaging all of said partitions, gas making material placed on said partitions, a container in said tank for gas making liquids, fiber conducting means leading from said container to feed to the gas making material adjacent to said container, and means for applying air pressure to the contents of said tank.

12. In an apparatus for generating gas, a tank, a series of fiber partitions horizontally disposed in said tank and spanning the interior thereof, gas making materials placed on said partitions, a liquid container in said tank above said partitions adapted to feed to the gas making material adjacent thereto, fiber conducting means engaging the several partitions, and a false bottom in said tank perforated and forming a gas chamber in the lower part of said tank.

13. In an apparatus for generating gas, a tank, a series of fiber partitions horizontally disposed in said tank, fiber conducting means engaging all of said partitions, gas making material placed on said partitions, a container in said tank for gas making liquids adapted to feed to the gas making material adjacent thereto, a charging pipe entering said container, and an air pressure pipe also entering said container.

In testimony whereof, I set my hand in the presence of two witnesses, this 15th day of April, 1911.

WILLIAM J. WATKINS.

Witnesses:
A. L. JACKSON,
S. D. MATHERS.

---

Copies of this patent may be obtained for five cents each, by addressing the "Commissioner of Patents, Washington, D. C."